G. B. PETSCHE.
BLOWING ENGINE OR COMPRESSOR.
APPLICATION FILED MAR. 17, 1910.

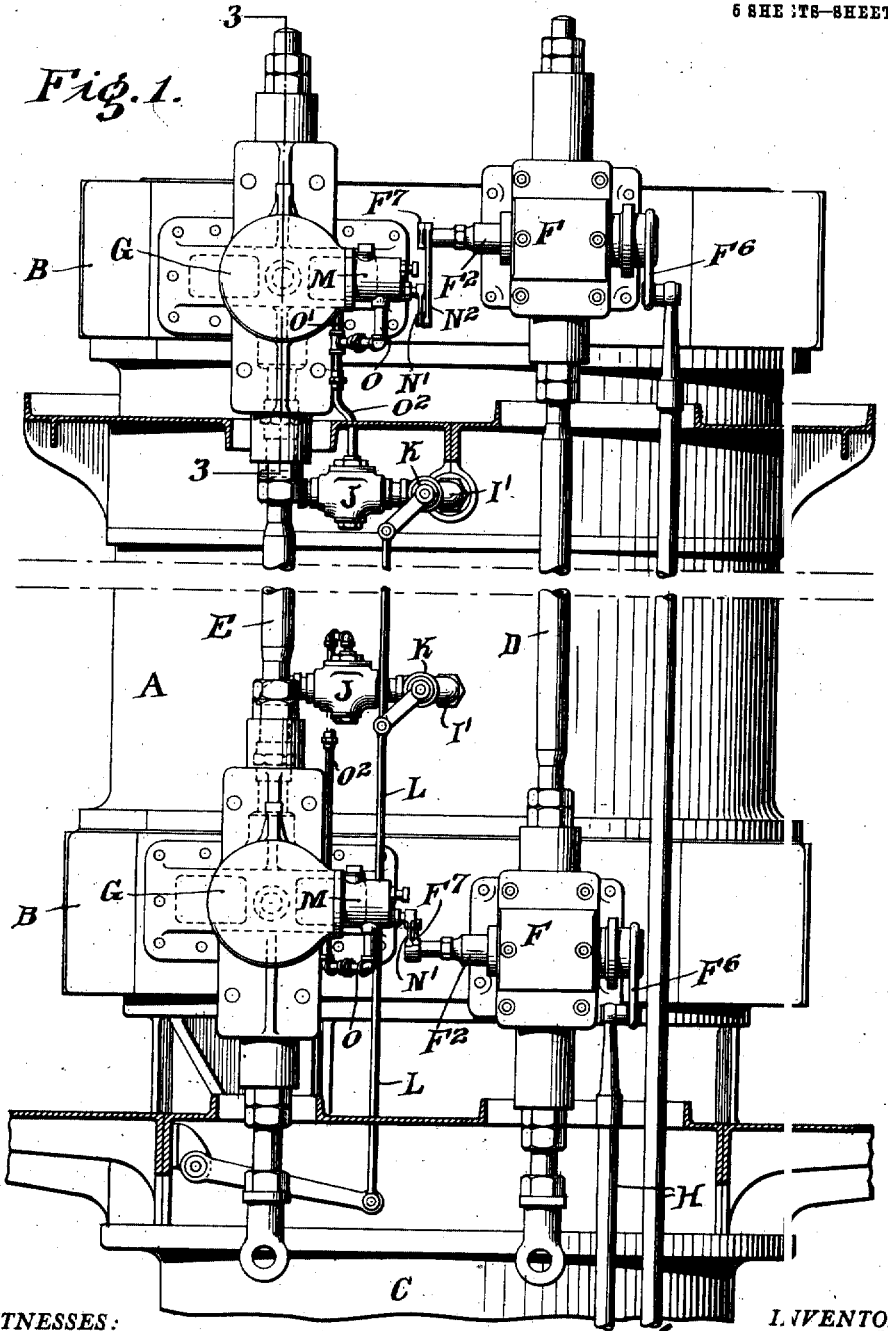

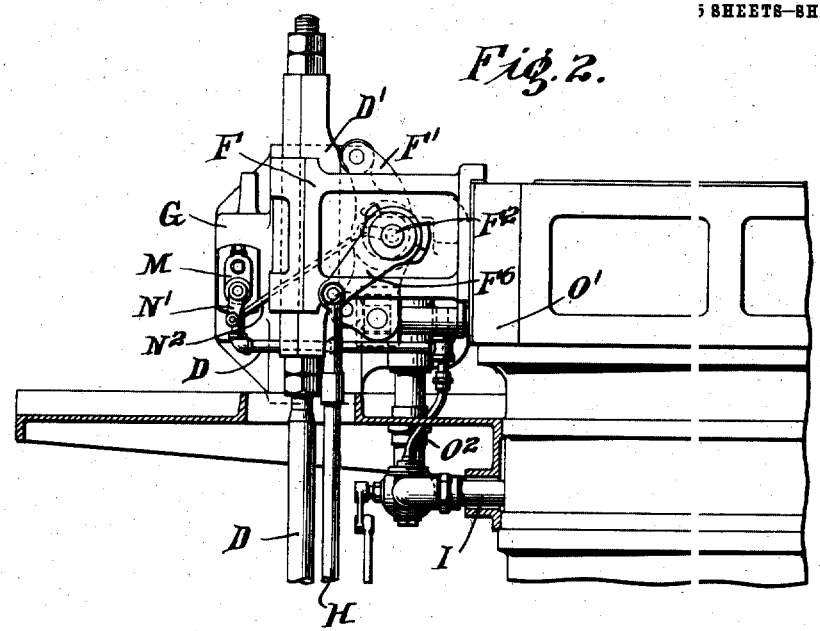
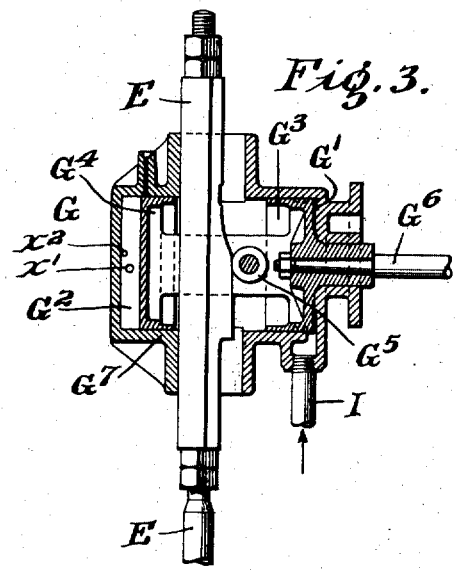

1,008,558.

Patented Nov. 14, 1911.
5 SHEETS—SHEET 3.

WITNESSES:
Daniel Webster, Jr.

INVENTOR
Gustav B. Petsche
BY
ATTORNEY.

G. B. PETSCHE.
BLOWING ENGINE OR COMPRESSOR.
APPLICATION FILED MAR. 17, 1910.
1,008,558.
Patented Nov. 14, 1911.
5 SHEETS—SHEET 4.
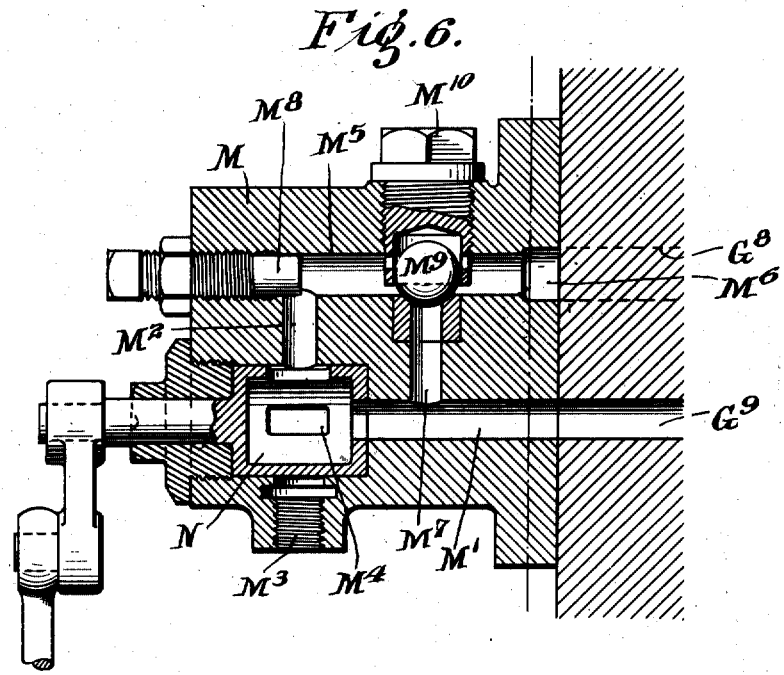
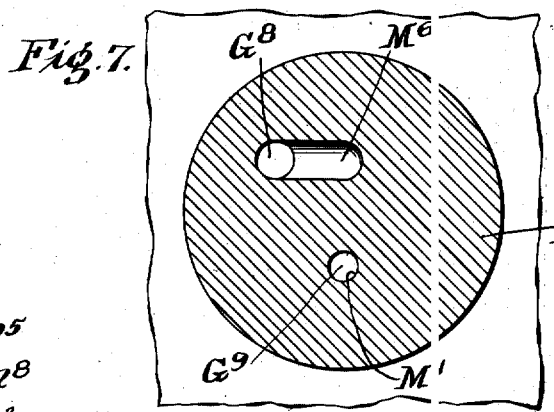
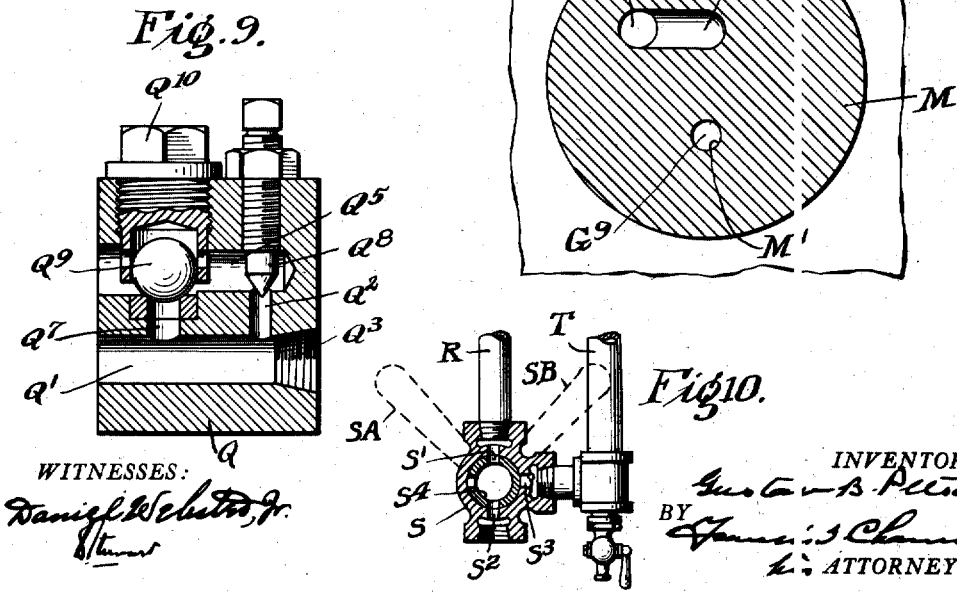

G. B. PETSCHE.
BLOWING ENGINE OR COMPRESSOR.
APPLICATION FILED MAR. 17, 1910.

1,008,558.

Patented Nov. 14, 1911.

5 SHEETS—SHEET 5.

UNITED STATES PATENT OFFICE.

GUSTAV B. PETSCHE, OF PHILADELPHIA, PENNSYLVANIA, ASSIGNOR TO SOUTHWARK FOUNDRY AND MACHINE COMPANY, OF PHILADELPHIA, PENNSYLVANIA, A CORPORATION OF PENNSYLVANIA.

BLOWING-ENGINE OR COMPRESSOR.

1,008,558.   Specification of Letters Patent.   Patented Nov. 14, 1911.

Application filed March 17, 1910.   Serial No. 550,014.

*To all whom it may concern:*

Be it known that I, GUSTAV B. PETSCHE, a citizen of the United States of America, residing in the city and county of Philadelphia, in the State of Pennsylvania, have invented a certain new and useful Improvement in Blowing-Engines or Compressors, of which the following is a true and exact description, reference being had to the accompanying drawings, which form a part thereof.

My present invention relates to blowing engines or compressors, and particularly to the well known type of reciprocating blowing engines in which the delivery valves for controlling communication between the ends of the compressing cylinder or tub of the engines and the receiver into which the compressed air is discharged, are automatically closed by a positively acting valve gear at the ends of the corresponding compression strokes and are automatically moved into the open position whenever the tub pressure rises to a predetermined value relative to the receiver pressure by means of fluid pressure devices.

The object of the present invention is to provide suitable mechanism for automatically holding the delivery valves closed under certain conditions of operation, when the opening of these valves might produce annoying or dangerous conditions.

The various features of novelty which characterize my invention are pointed out with particularity in the claims annexed to and forming a part of this specification.

For a better understanding of the invention, however, and the advantages possessed by it, reference may be had to the accompanying drawings and descriptive matter in which I have illustrated and described forms in which the invention may be embodied.

Figure 4:
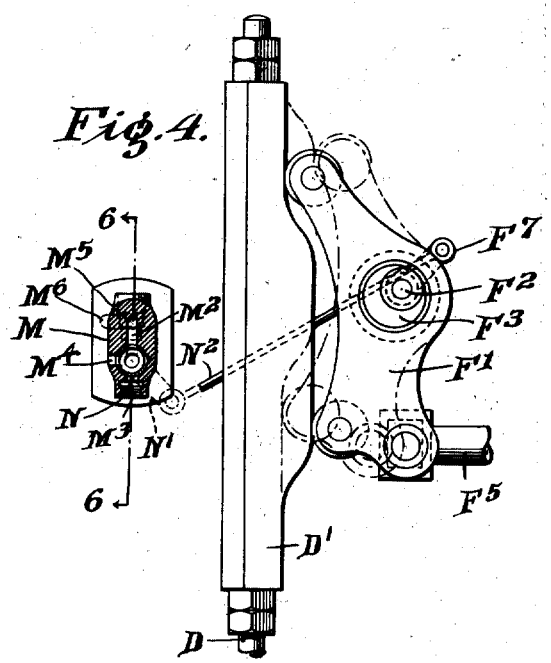
Figure 5:
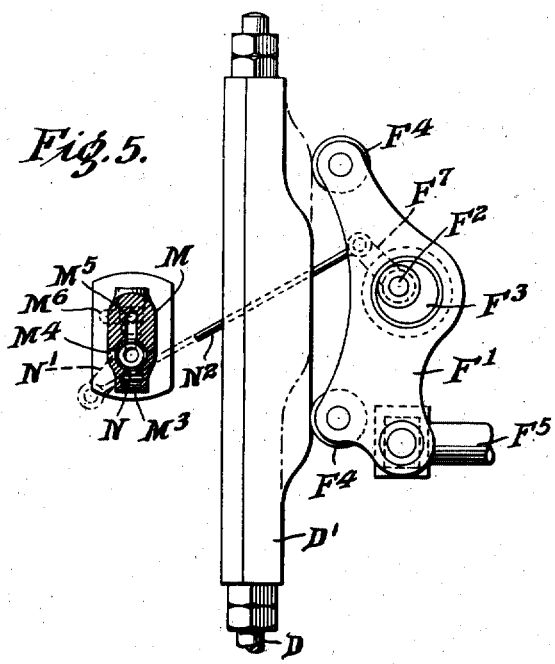
Figure 8:
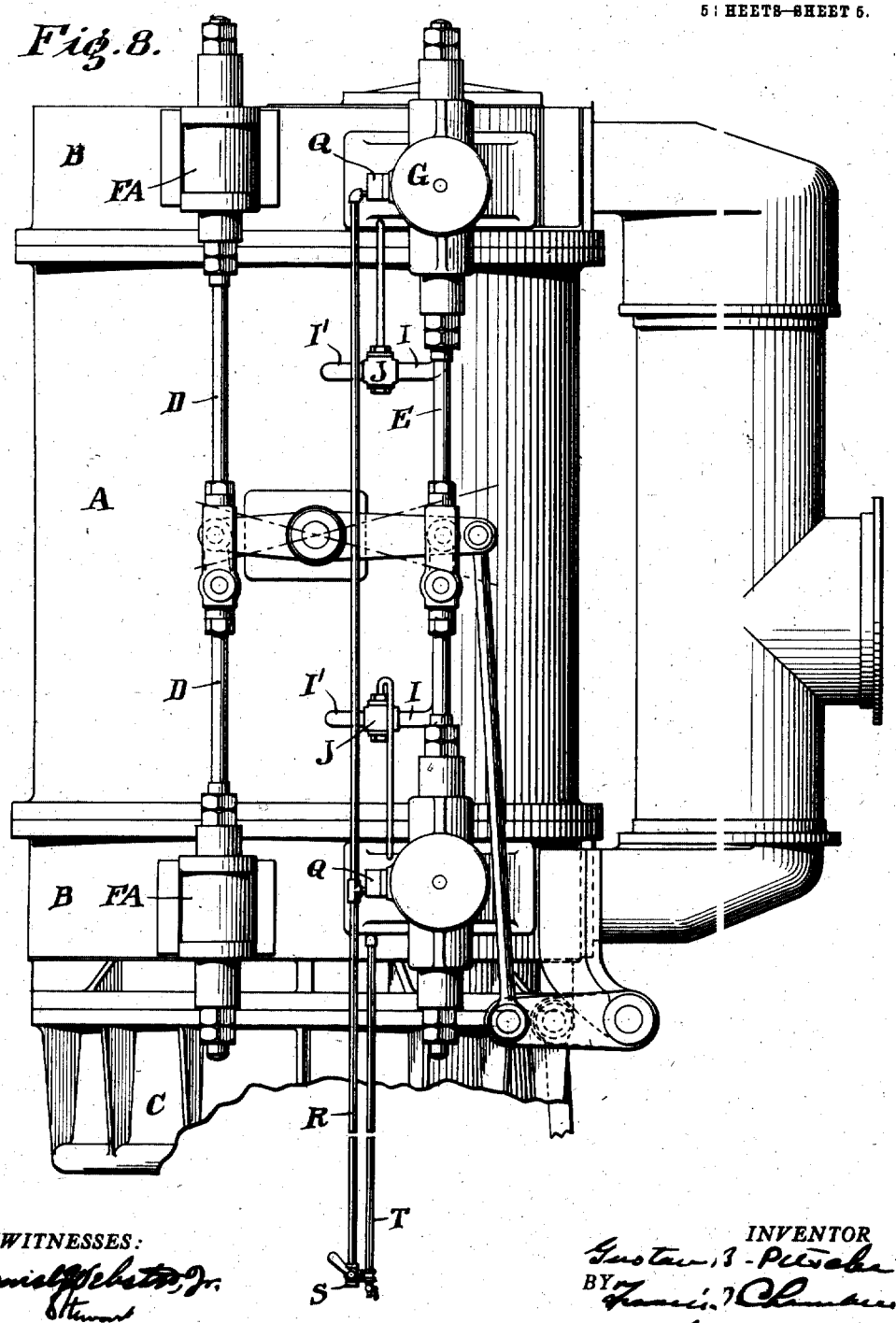

Of the drawings, Figure 1 is an elevation of a portion of a blowing engine embodying my present invention. Fig. 2 is a side elevation, with parts broken away and in section, of a portion of the apparatus shown in Fig. 1. Fig. 3 is a partial section on the line 3—3 of Fig. 1. Fig. 4 is an elevation, partly diagrammatic and partly in section, illustrating the inlet valve operating mechanism of the engine shown in Fig. 1, and the connection between it and the means for holding the corresponding delivery valve closed. Fig. 5 is a view, similar to Fig. 4, but showing the parts in different position. Fig. 6 is a partial large scale section on the line 6—6 of Fig. 4. Fig. 7 is a section on the line 7—7 of Fig. 6. Fig. 8 is an elevation of a blowing engine embodying a modified form of the invention. Fig. 9 is an enlarged view, partly in section, of one portion of the apparatus shown in Fig. 8, and Fig. 10 is an enlarged section of another portion of the apparatus shown in Fig. 8.

In the drawings, and referring first to the construction shown in Figs. 1 to 6, inclusive, A represents the vertical compressing cylinder or tub of a blowing engine of well known type. B, B, represent the heads of the cylinder, in each of which is formed a receiver chamber for the air compressed in and discharged from the cylinder A. The admission and outlet valves (not shown) for each end of the cylinder are located in the corresponding head B. D and E represent valve actuating cam rods reciprocating in fixed time relation with the movements of the compressing piston working in the cylinder A. F, F, represent the admission valve actuating devices coöperating with the cams D', D', carried by the cam rod D; and G, G, represent the corresponding delivery valve actuating devices controlled in part by the cams E', E', carried by the cam rod E.

As shown in Figs. 4 and 5, the stem $F^5$ of each delivery valve is connected to one arm of a rock lever F' pivoted on an eccentric $F^3$ carried by a rock shaft $F^2$. The latter has, at opposite sides of its pivotal center, antifriction rolls $F^4$ which bear against the face of the corresponding cam D', and in normal position the to and fro movement of the cam D' rocks the lever F back and forth from the full line position shown in Fig. 4, in which the admission valve is open, into the dotted line position shown in that figure in which the admission valve is closed. An arm $F^6$ (not shown in Figs. 4 and 5) secured to the rock shaft $F^2$, and operated either manually or automatically by the corresponding rod H, serves as a means for turning the shaft $F^2$ to throw the eccentric $F^3$ into, and out of, the position shown in Fig. 5 in which the admission valve is maintained in the open position.

The operating mechanism for the inlet valves, so far as described, may be identical with the structure disclosed and claimed in my prior Patent No. 966,469 granted August 9, 1910.

The delivery valve operating mechanism, shown best in Fig. 3, comprises a housing $G^7$ formed with guides for the corresponding cam $E'$ and cylinder chambers $G'$ and $G^2$ for the rigidly connected together pistons $G^3$ and $G^4$. A cam roll $G^5$, carried by the piston structure $G^3$, $G^4$, is engaged by the working face of the cam $E'$ on one movement of the latter to force the delivery valve into the closed position, the stem $G^6$ of the delivery valve being secured to the piston structure $G^3$, $G^4$. In normal operation, each delivery valve is opened at the particular point in each stroke of the compressing piston at which the pressure in the tub or cylinder A rises to an equality with the pressure in the receiver. To produce the opening movements of each delivery valve, air is admitted to the piston chamber $G'$ by the pipes I and I' from the compressing cylinder adjacent the corresponding end of the latter. Communication between pipes I and I' in the form of the apparatus shown is controlled by a loaded valve J, the opening of which is governed by pressure from the receiver conveyed to the valve J by the pipes $O'$ and $O^2$. Air trapped in the cylinder chamber $G^2$ serves to cushion the opening movement of the delivery valve. In so far as the delivery valve operating mechanism has been described up to this point, it does not differ from what has before been known, and may be identical with the construction described and claimed in my prior Patent 912,486, granted Feb. 16, 1909.

With the mechanism heretofore described there is a possibility for annoyance and even substantial damage from the failure of the delivery valves to be held closed under certain conditions when they should be closed. For instance, if, from some cause, the engine should stop with a delivery valve open, the receiver pressure would tend to start the engine running backward, and if the delivery valve should be open while the admission valve is also open, as is possible with the engine disclosed, where provisions are made for maintaining the admission valves in the open position under certain conditions, the receiver pressure would then discharge through the admission ports, and this in addition to the waste of compressed air produces consequences which, if not dangerous, are at least highly annoying.

The undesirable consequences of having the delivery valves open when they should be closed may be avoided by the use of the provisions which I have made in the apparatus disclosed herein for obtaining a prompt and positive closure of the delivery valves and the positive maintenance of these valves in their closed position whenever it is desired to bring about or maintain such closure. To accomplish this in the apparatus disclosed herein I utilize the cylinder chambers $G^2$ and pistons $G^4$ by means of which the opening movement of the delivery valves are cushioned in normal operation and combine therewith provisions for establishing and maintaining within each chamber $G^2$ a fluid pressure sufficient to close the delivery valves and hold them closed when it is desired to bring about or maintain such closure. In the form of apparatus shown in Figs. 1 to 7, inclusive, air from the receiver is supplied to each chamber $G^2$ when it is desired to positively close the corresponding delivery valve and maintain it closed through pipes $O'$ and $O$ and valve casing M and contained parts. The valve mechanism M and contained parts shown best in Figs. 4, 5, 6 and 7 are utilized also in the normal operation of the engine as hereinafter explained, in regulating the action of cylinder $G^2$ and piston $G^4$ in cushioning the opening movements of the delivery valves. As shown in Figs. 4 to 7, $M^3$ represents the inlet port to which the pipe O leads. A hollow ported rotating valve member N normally closes the port $M^3$ while permitting the passage of atmospheric air into and out of the valve casing through the lateral port $M^4$, as shown best in Fig. 4, which is then in register with a port of the valve member N. The port $M'$ provides direct communication between the interior of the valve member M and the interior of the piston chamber $G^2$ through a port $G^9$ opening into chamber $G^2$ opposite the circle $X'$ of Fig. 3. A channel or port $M^5$, parallel to the port $M'$, is connected to the piston chamber $G^2$ by a lateral channel $M^6$, and a port $G^8$ opening through the wall of the chamber $G^2$ opposite the circle $X^2$ of Fig. 3. A channel $M^7$ connects the channels $M'$ and $M^5$. The channel $M^7$ is normally closed by the non-return ball valve $M^9$ mounted in the valve plug $M^{10}$. A second channel or port $M^2$ connects the port $M^5$ with the interior of the valve N, and thereby to the lateral port $M^4$ leading to the atmosphere when the valve N is in its normal position, as shown in Fig. 4. A screw plug $M^8$ serves as a means for restricting in a regulated manner the escape of air from the channel $M^5$ to the channel $M^2$. In ordinary operation, so long as the port $G^9$ opening opposite the circle $X'$ of Fig. 3 is uncovered by the piston portion $G^4$, relatively free communication between the chamber $G^2$ and the atmosphere takes place through the channel or port $M'$ and port $M^4$. When the piston $G^4$, moving outward, however, covers the port $G^9$ opposite the circle $X'$, air is trapped in the chamber $G^2$ to cushion the final opening movement of the delivery valve, for after the port $G^9$ is closed air can only escape from the cylinder chamber G² through the port G⁸, passage M⁶, port M⁵, and port M², the non-return valve M⁹ then closing the port M⁷. As soon, however, as the piston G⁶ starts to move inward, air may freely enter the chamber G² to prevent the formation of a vacuum for the valve M⁹ then lifts off its seat and channel M⁷ forms a bypass about the restricted upper end of the channel M².

When it is desired to prevent the delivery valve from opening, and to hold it closed, the valve N is rotated into the position shown in Fig. 5 in which the lateral port M⁴ is closed and in which the receiver pressure is admitted to the channel M' of the valve casing through the port M³. It will be observed that the effective cross sectional area of the piston G⁴, exposed to the action of the pressure in the chamber G², is substantially greater than the effective area of the piston G³ exposed to the pressure in chamber G', and in consequence plenty of power is available for closing the delivery valve if open, and for holding it closed whenever the receiver pressure is admitted to the piston chamber G².

With the provisions for holding the admission valve open, embodied in the machine shown in Figs. 1 to 7, inclusive, it is desirable that the delivery valves should be closed and held against opening whenever the admission valves are prevented from closing, and accordingly I have provided means which automatically insures the admission of the receiver pressure to the chamber G² of each delivery valve actuating device whenever the corresponding admission valve rock lever F is thrown into the inoperative position shown in Fig. 5. I accomplish this by connecting an arm F⁷ on the rock shaft F² to the arm N' on the shaft of the valve N by a link N², so that when the shaft F² is rocked from the position shown in Fig. 4 to the position shown in Fig. 5, the valve N is correspondingly operated to open the port M³ and close the port M⁴. It will be understood that the connections between the valve N and shaft F² may be essentially the same at both ends of the compressing cylinder, although the slight difference in relative levels between the valve and the shaft F² at the two ends of the engine make the connections appear different in Fig. 1.

It will be understood that in engines of this character snifting ports are provided which limit the maximum pressure obtainable in the compressing cylinder. I have not thought it necessary to illustrate such snifting port, however, as their use is practically common and their construction well known in engines of this type as shown for instance in the Marichal Patent No. 556,548, granted March 17, 1896.

In Fig. 1, K, K, represent valves in the pipe sections I' controlled by means of an operating rod L. These valves may be used in some cases to cut off communication between the compressing cylinder and the piston chambers G' of the delivery valve actuating devices G. With the valves K closed pressure cannot be admitted to the chambers G' to open the delivery valves G. In general there is no need for providing the valves K and the actuating rod L therefor where means are provided, as in Fig. 1, for holding the delivery valve closed by means of air admitted to the piston chambers G² when such closure is desired. The two devices may be used in conjunction with advantage under some conditions, however, for the valves K and rod L form a means for simultaneously preventing the opening of the two delivery valves, while by shifting the one rod H and not the other, only one of the admission valves is held open and only the corresponding delivery valve is held closed.

Provisions for closing valves similar, and similarly disposed in blowing engine organizations to the valves K, K, described in the preceding paragraph have long been known, and in the Symons Patent No. 813,064 such valves are disclosed in combination with provisions for automatically closing them upon any retrograde or backward running movement of the blowing engine. Such valves (K, K,) in the coöperative relation disclosed, and in combination with the provisions for closing them, while intended to prevent the opening of the delivery valves under certain circumstances, are not effective in themselves to close the delivery valves, and their operation in maintaining the delivery valves closed after the latter have been closed by other means, is indirect and negative, since it consists in preventing the normal operation of the provisions for opening the delivery valves, and, on this account, are to be distinguished from the provisions herein disclosed and claimed, which operate positively on the delivery valves by causing a force to be applied thereto which positively closes the valves, if open, and when closed, positively maintains such closure.

Instead of having the delivery valve locking mechanism connected to the admission valve gear, as in the arrangement shown in Figs. 1 to 7, provisions may be made for causing the delivery valves to be positively forced into and maintained in the closed position whenever desired, regardless of the condition of the admission valves, and in Figs. 9 and 10 I have shown details of apparatus by which this can be done.

The blowing engine shown in Fig. 8 is of the same general type as that shown in Fig. 1, although the inlet valve actuating mechanism FA need not be identical with the corresponding devices F of the construction first described. In this form of the invention the valve casing members M are replaced by valve casing members Q which comprise parts $Q'$, $Q^2$, $Q^5$, $Q^6$, $Q^7$, $Q^8$, $Q^9$, and $Q^{10}$, generally like the parts M with corresponding exponents, but there is no port corresponding to port $M^4$, and there is no valve mounted in the casing Q corresponding to the valve N. In this construction a pipe R connects the port $Q^3$ of each casing Q to a manually controlled valve S which, in the normal position shown in Fig. 10 with the handle in the position indicated at SA, connects the pipe R to the atmosphere through ports $S'$ and $S^2$ of the valve casing and the hollow ported valve member $S^4$. When the valve member $S^4$ is rotated into the position in which the handle lies in the dotted line position SB of Fig. 10, the port $S^2$ is closed and the port $S'$ opening to the pipe R is in communication with the port $S^3$ open to the lower end of a pipe T which is connected at its upper end to the receiver. With this arrangement, simple manipulation of the manually actuated valve S is all that is necessary to change the apparatus from its normal condition of operation in which each piston chamber $G^2$ of the delivery valve mechanism G serves simply as a device for cushioning the final opening movement of the corresponding delivery valve, into the condition in which the receiver pressure is admitted to the piston chambers $G^2$ and the delivery valves are held in the closed position.

It will be observed by those skilled in the art that the apparatus disclosed forms a simple and effective mechanism for holding the delivery valves closed when desired. This is accomplished, moreover, in the form disclosed, with but a very slight modification of an existing type of apparatus and in particular without affecting the action of the piston $G^4$ and the chambers in which they work in cushioning the opening movements of the valves in normal operation.

It will be apparent to those skilled in the art that many changes may be made in the form of the apparatus disclosed without departing from the spirit of my invention, and I do not wish the claims hereinafter made to be limited to the particular embodiments disclosed further than is made necessary by the state of the art.

I claim:

1. The combination, in a blowing engine or compressor having a compressing cylinder, a delivery valve, and means for opening and closing the delivery valve in normal operation, of supplemental means for positively maintaining the delivery valve in the closed position.

2. The combination, in a blowing engine or compressor having a compressing cylinder, a delivery valve, means for opening and closing the delivery valve in normal operation, admission valves, means for normally opening and closing the admission valves at fixed points in the stroke of the engine, and means for maintaining the admission valves open regardless of the strokes of the engine, of means actuated by the last mentioned means for positively holding the delivery valves closed while the admission valves are maintained in the open position.

3. The combination, in a blowing engine or compressor having a compressing cylinder, a delivery valve, fluid pressure means normally acting to open the valve upon a predetermined rise in pressure in said cylinder, and means for positively closing the delivery valve at the end of each compressing stroke in normal operation, of supplemental means for positively maintaining the delivery valves closed regardless of the pressure variations in the compressing cylinder.

4. The combination in a blowing engine or compressor having a compressing cylinder, a delivery valve, fluid pressure means normally acting to open the valve upon a predetermined rise in pressure in said cylinder, and means for positively closing the delivery valve at the end of each compressing stroke in normal operation, of supplemental means for positively maintaining the delivery valves closed regardless of the pressure variations in the compressing cylinder, said supplemental means comprising fluid pressure mechanism adapted to act upon the valve in a direction tending to move the latter into the closed position, and provisions for supplying fluid under pressure to said mechanism.

5. The combination in a blowing engine or compressor having a compressing cylinder, a delivery valve, and a mechanism for operating the valve, including a piston and cylinder normally serving as a means to check and cushion the opening movement of the delivery valve, of valve controlling means for connecting the last mentioned cylinder to a source of fluid pressure to thereby maintain the delivery valve closed.

6. In a blowing engine having a compressing cylinder, a reciprocating compressing piston working therein, a receiver chamber, a delivery valve controlling communication between said cylinder and receiver, operating mechanism for the valve including means for positively closing the valve at fixed points in the stroke of the compressing piston, a differential piston having opposed portions of different effective cross sectional areas, and chambers in which said piston portions work, connections between the chamber in which the smaller of said piston portions work and the compressing cylinder, whereby the pressure in the latter is transmitted to said chamber to thereby open the delivery valve at the proper time, of provisions for normally permitting a restricted escape of air into the atmosphere from the other of said chambers when the delivery valve opens, whereby the opening movement of the valve is cushioned thereby, and a valved connection between said other chamber and the receiver whereby the receiver pressure may be admitted to said other chamber to hold the delivery valve closed regardless of the pressure in the compressing cylinder.

7. The combination, in a blowing engine or compressor, of a compressing cylinder, a delivery valve and mechanism for operating the valve, including a piston and cylinder normally serving as a means for checking and cushioning the opening movement of the delivery valve, said cylinder having two ports, one of which is closed by said piston after a slight travel of the latter in the valve opening direction, means adapted to restrict the escape of air from the cylinder through the other of said ports without impeding the admission of air through to said cylinder, and a valve and connections whereby said ports may be placed in communication with the atmosphere or with a source of fluid under pressure.

8. The combination, in a blowing engine or compressor, of a compressing cylinder, a delivery valve and mechanism for operating the valve, including a piston and cylinder normally serving as a means for checking and cushioning the opening movement of the delivery valve, said cylinder having two ports, one of which is closed by said piston after a slight travel of the latter in the valve opening direction, a casing having a valve chamber, and means including a valve mounted in said chamber for connecting said port or chamber either to the atmosphere or to a source of air under pressure, said casing being provided also with a passage establishing communication between said chamber and said one port, and with a second passage connected to the other of said ports, and with a pair of passages connecting said two passages, one of said connecting passages being restricted and the other including a non-return valve opening to permit the entrance of air to the cylinder and closing to retard the escape of air therefrom.

9. The combination, in a blowing engine or compressor, of a compressing cylinder, a delivery valve and mechanism for operating the valve, including a piston and cylinder normally serving as a means for checking and cushioning the opening movement of the delivery valve, said cylinder having two ports, one of which is closed by said piston after a slight travel of the latter in the valve opening direction, a casing formed with a passage communicating with said one port and with a second passage in communication with the other of said ports, and with two passages, one of which is restricted, connecting the first mentioned passages, and a non-return valve in the second of said connecting passages adapted to open to permit the entrance of air to the cylinder and to close to retard the escape of air therefrom.

GUSTAV B PETSCHE.

Witnesses:
 ARNOLD KATZ,
 D. STEWART.

---

Copies of this patent may be obtained for five cents each, by addressing the "Commissioner of Patents, Washington, D. C."